(12) United States Patent
Abate et al.

(10) Patent No.: US 12,047,226 B2
(45) Date of Patent: Jul. 23, 2024

(54) SYSTEMS AND METHODS FOR ARBITRATED FAILOVER CONTROL USING COUNTERMEASURES

(71) Applicant: Fortinet, Inc., Sunnyvale, CA (US)

(72) Inventors: Jason Abate, Chicago, IL (US); Niraj Nandane, Pune (IN); Pooja Singh, Pune (IN); Shabbir Karimi, Chicago, IL (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 17/901,075

(22) Filed: Sep. 1, 2022

(65) Prior Publication Data

US 2024/0080239 A1     Mar. 7, 2024

(51) Int. Cl.
*H04L 41/0668* (2022.01)
*H04L 41/0663* (2022.01)

(52) U.S. Cl.
CPC ...... *H04L 41/0668* (2013.01); *H04L 41/0663* (2013.01)

(58) Field of Classification Search
None
See application file for complete search history.

(56) References Cited

U.S. PATENT DOCUMENTS

| 2008/0098113 | A1* | 4/2008 | Hansen | H04L 67/1034 370/389 |
| 2011/0283149 | A1* | 11/2011 | Richmond | G06F 11/3055 714/39 |
| 2016/0140012 | A1* | 5/2016 | Hsu | H04L 69/40 702/186 |
| 2017/0359243 | A1* | 12/2017 | Deuri | H04L 45/74 |
| 2021/0318366 | A1* | 10/2021 | Cardozo | H04W 24/08 |

* cited by examiner

*Primary Examiner* — Mohamed Ibrahim
(74) *Attorney, Agent, or Firm* — Jaffery Watson Mendonsa & Hamilton LLP

(57) ABSTRACT

Various approaches for multi-node network cluster systems and methods. In some cases systems and methods for incident detection and/or recovery in multi-node processors are discussed.

18 Claims, 6 Drawing Sheets

SYSTEMS AND METHODS FOR ARBITRATED FAILOVER CONTROL USING COUNTERMEASURES

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2021, Fortinet, Inc.

FIELD

Embodiments of the present invention generally relate to multi-node network clusters, and more particularly to systems and methods for incident detection and/or recovery in multi-node network clusters.

BACKGROUND

A two-node active/passive (A/P) high availability (HA) network cluster is used to provide redundancy to a system by continuously or regularly performing session synchronizations for client-server traffic from a master (active) to a slave (passive) node over a single or a group of high availability synchronization (HA sync) interfaces on both the master and slave nodes. In such clusters, the designation of master and slave roles is relative to a particular user session, and user traffic processes through data transfer interfaces of the master node. While the redundancy of such network clusters in general increases network availability, in some cases, improper control over failover from a master node to a slave node can be done prematurely resulting in considerable waste of resources as a failover is a very expensive process. Alternatively, failover may be done improperly due to improper communications between a master node and a slave node resulting in a catastrophic network failure.

Thus, there exists a need in the art for more advanced approaches, devices and systems for implementing and deploying network clusters.

SUMMARY

Various embodiments provide systems and methods for incident detection and/or recovery in multi-node clusters.

This summary provides only a general outline of some embodiments. Many other objects, features, advantages and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower-case letter is associated with a reference numeral to denote one of multiple similar components. When reference is made to a reference numeral without specification to an existing sub-label, it is intended to refer to all such multiple similar components.

DETAILED DESCRIPTION

Figure 1A:
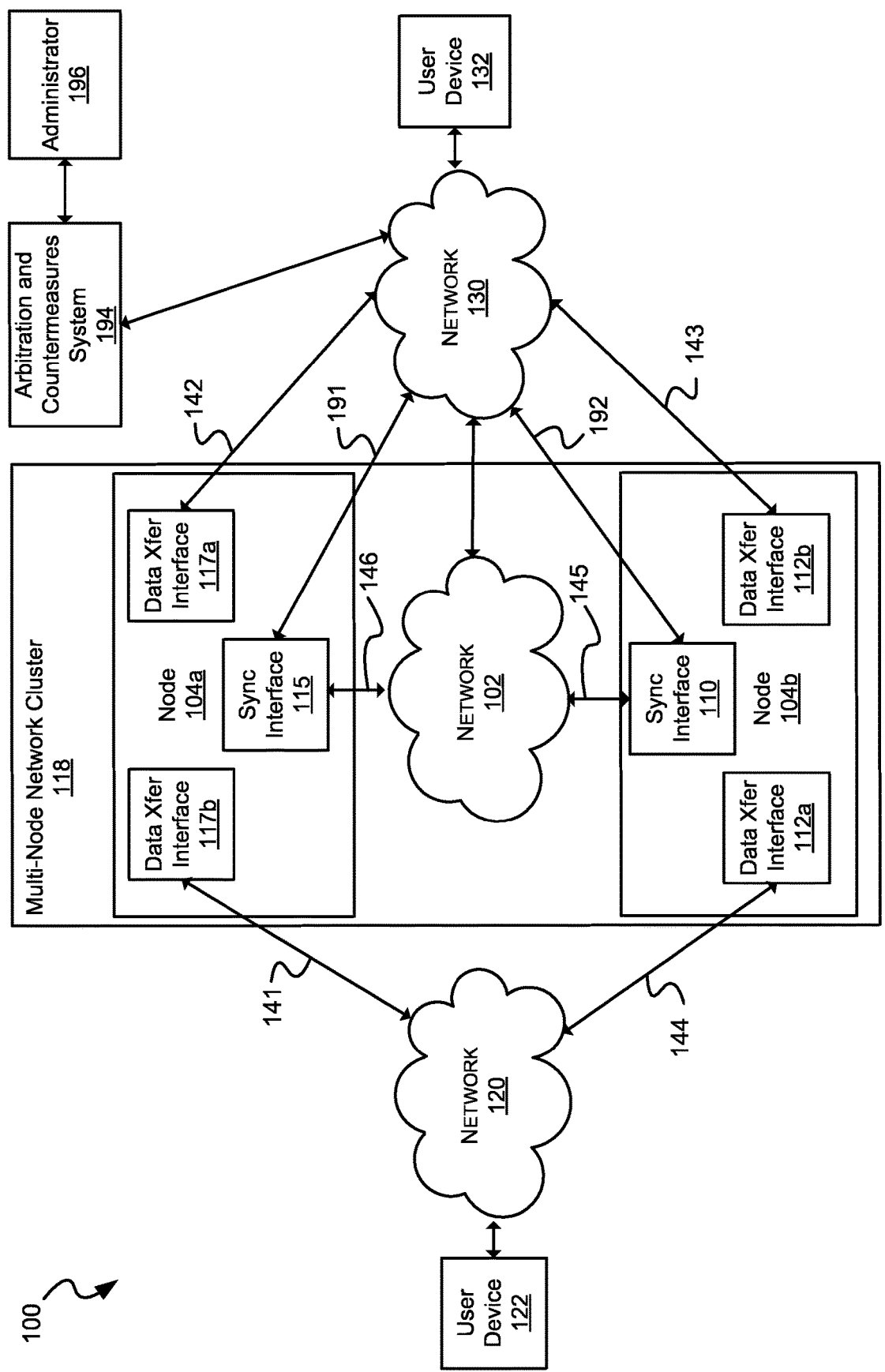
FIGS. 1A-1B illustrate a network architecture including a multi-node network cluster monitored by an arbitration and countermeasures system in accordance with some embodiments.

Various embodiments provide systems and methods for incident detection and/or recovery in multi-node clusters.

Application monitoring can be inbuilt with application itself (i.e., self monitoring). Such self monitoring can be done on standalone setup and also for cluster setup, but has its limitations. For example, How to detect the node failure if node itself goes down? This can be detected if there is cluster where another node has oversight. In a cluster, another node in the cluster can detect node down and report alert. However, the problem remains if all the cluster goes down. Hence, some embodiments discussed herein provide a "sidecar server" for monitoring purposes. The monitoring is separate activity and it may deviate a purpose of original application if it was to include extensive self monitoring. In general, self monitoring is useful only for few metrics such as, for example, RAM, disk, etc. Further, self monitoring can become bottleneck if it keeps increasing in number of metrics, which of course, will keep increasing as application become more and more mature and feature heavy.

Monitoring can be more user friendly and manageable if it is integrated with an Application Monitoring (APM) and/or Digital Experience Monitoring (DEM) tool. Since these tools are for monitoring purpose and ready with full bunch of features including charts, graphs, history maintenance, incident management, platform integrations such as Slack, Microsoft Teams etc.

Embodiments of the present disclosure include various processes, which will be described below. The processes may be performed by hardware components or may be embodied in machine-executable instructions, which may be used to cause a general-purpose or special-purpose processor programmed with the instructions to perform the steps. Alternatively, processes may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

In the following description, numerous specific details are set forth in order to provide a thorough understanding of embodiments of the present disclosure. It will be apparent to one skilled in the art that embodiments of the present disclosure may be practiced without some of these specific details.

The following provides steps which may be followed to perform cluster monitoring including failover and firedrill in accordance with some embodiments.

1. Application provides all the data required for externalized monitoring over single API.

```
GET /cluster/health
{
  "swap": {
    "total": 4294963200,
    "used": 1846591488,
    "free": 2448371712,
    "percent": 43.0
  },
  "ram": {
    "total": 8201256960,
    "used": 6819368960,
    "avail": 951570432,
    "percent": 88.4
  },
  "disk": [
    {
      "mountpoint": "/",
      "device": "/dev/mapper/vgos-root",
      "total": 6431965184,
      "used": 2920144896,
      "avail": 3511820288,
      "percent": 45.4
    }
  ],
  ...
}
```

2. There is adapter plugin which converts the information fetched from application API into the format required by APM/DEM.
3. APM/DEM OS user talk with plugin and get required data.
4. Above process is run after every configured minute.
5. On every data collection, APM/DEM decide if there is need to create an alert. If yes, alert is created and notified to the user. If there is automated remediation configured, then it is run on the server and result is captured.
6. Application admin can login to the APM/DEM portal and see the automated remediation action output and the alert timeline like when alert is created, when remediation ran etc.

In some cases, approval based remediation is also possible for critical things like failover. For APM/DEM, the alert threshold is configurable using template.

The following shows various example processes that may be applied to perform failovers using a failover countermeasure in accordance with some embodiments:

1. All secondary nodes in cluster monitors the primary node heartbeat.
2. If primary node is down for configurable time, here, in this case, it is 20 minutes, secondary node creates an alert for failover with configured remediation and wait for approval.
3. Administrator gets an email for approval of failover countermeasure.
4. During failover, other remaining cluster nodes joins new elected primary node (the node for which countermeasure is approved), and hence as per the failover flow for product, the role for remaining node might change when joining to the new cluster primary node.
5. Administrator can configure the new roles for remaining node using attributes. Attributes are nothing but key-value pair or tags, which gets passed to the failover countermeasure.
6. APM/DEM tool calls failover countermeasure by passing payload. This payload contains all the metadata required for failover. It includes roles for remaining node which need to configure against the new primary node and other relevant data.
7. Failover countermeasure has logic to decode the payload, gets the new role, and reconfigure the cluster.
8. Once action is complete, all output for executed countermeasure is visible on APM/DEM tool.

Terminology

Brief definitions of terms used throughout this application are given below.

The terms "connected" or "coupled" and related terms, unless clearly stated to the contrary, are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

The term "daemon" is used in its broadest sense to mean a set of instructions executable by a processing resource that runs as a background process to perform defined tasks. Based upon the disclosure provided herein, one of ordinary skill in the art will recognize a variety of daemons that may be used in relation to different embodiments.

The phrase "network element malfunction" is used in its broadest sense to mean any malfunction within a network environment including, but not limited to: a failure of a network server; a failure of a cloud based service; a failure of an endpoint device; a failure of a software application executing on a device in the network such as, for example, a network server or an endpoint device; and/or a failure of a downstream provider. Based upon the disclosure provided herein, one of ordinary skill in the art will recognize a myriad of malfunctions that may be considered a network element malfunction.

The phrase "automated remediation" is used in its broadest sense to mean one or more actions that are automatically employed as part of diagnosing and/or mitigating a network condition based upon the occurrence of a condition set. For example, where it is detected that the CPU usage of a network device has exceeded a defined threshold for a defined period (i.e., the condition set), the automated remediation may be to assign an incident lead and log the incident lead into the particular network device. Such an automated remediation that automatically connects an incident lead and provides status may be referred to herein as a "diagnostic automated remediation". As another example, where it is detected that the memory usage of a network device has exceeded a defined threshold for a defined period (i.e., the condition set), the automated remediation may be to automatically restart the network device and send a message to an incident lead identifying the conditions surrounding the incident. As yet another example, where it is detected that the CPU usage of a network device has exceeded a defined threshold for a defined period (i.e., the condition set), the automated remediation may be to automatically stop a process executing on the network device that is using significant CPU bandwidth. Such automated remediations that automatically modify the operation of one or more network devices may be referred to herein as an "active automated remediation". Such automated remediations may be pre-programmed solutions that a user selects to automatically execute whenever one or more metrics (i.e., a condition set) match a pre-programmed threshold. Based upon the disclosure provided herein, one of ordinary skill in the art will recognize a variety of automated remediations, both diagnostic and active, that may be employed in relation to different embodiments. Further, based upon the disclosure provided herein, one of ordinary skill in the art will recognize a variety of condition sets that may be used to trigger automated remediations in relation to different embodiments.

The phrase "processing resource" is used in its broadest sense to mean one or more processors capable of executing instructions.

The term "failover" is used in its broadest sense to mean user traffic that was to be processed by a first node that is processed by a second node based upon a transfer algorithm. Thus, as an example, user traffic may be grouped into a session that is to be processed by a master node. Upon failure of the master node, all or a remaining portion of the user traffic (i.e., the failover) is processed by a slave node. Based upon the disclosure provided herein, one of ordinary skill in the art will recognize a variety of failover that may be processed in accordance with different embodiments.

The term "split-brain" is used in its broadest sense to mean any situation where two or more nodes are operating as masters at the same time. Based upon the disclosure provided herein, one of ordinary skill in the art will recognize a variety of split-brain situations that may be identified and/or mitigated in accordance with different embodiments.

Some embodiments provide methods for providing multi-node network cluster oversight. The methods include: receiving, by a processing resource, a first operational status of a first node in a network cluster via a communication network; receiving, by a processing resource, a second operational status of a second node in the network cluster via the communication network; determining, by the processing resource, based at least in part on the first operational status that the first node is not fully operational; selecting, by the processing resource, at least a first countermeasure; and applying, by the processing resource, the at least first countermeasure to the first node.

In some instances of the aforementioned embodiments, the first countermeasure is a failover countermeasure, and the network cluster transitions the first node to a slave node and the second node to a master node upon application of the first countermeasure. In some such instances, application of the first countermeasure includes: requesting, by the processing resource, permission to perform a failover in the network cluster from an administrator; and commanding, by the processing resource upon receiving permission from the administrator, the network cluster to perform the failover.

In various instances of the aforementioned embodiments where the first countermeasure is operable to improve the operational status of the first node, the methods further include: determining, by the processing resource, that application of the first countermeasure in the first node failed to bring the first node to an expected operational standard; and applying, by the processing resource, a second countermeasure to the first node based at least in part on the failure of the first countermeasure. In some such instances, the second countermeasure is a failover countermeasure, and the network cluster transitions the first node to a slave node and the second node to a master node upon application of the second countermeasure.

In one or more instances of the aforementioned embodiments, the first operational status includes a first node operational status reported by the first node and a first node operational status reported by the second node; and the second operational status includes a second node operational status reported by the first node and a second node operational status reported by the second node. In other instances of the aforementioned embodiments, there is a mismatch between the first node operational status reported by the first node and the first node operational status reported by the second node, and determining that the first node is not fully operational is based at least in part on the mismatch. In some cases determining that the first node is not fully operational is based at least in part on the first node operational status reported by the second node and the first node operational status reported by the first node both indicating that the first node is operating below an expected standard.

Other embodiments provide systems for providing multi-node network cluster oversight that include a processing resource, and a non-transient computer readable medium coupled to the processing resource. The non-transient computer readable medium has stored therein instructions that when executed by the processing resource cause the processing resource to: receive a first operational status of a first node in a network cluster via a communication network; receive a second operational status of a second node in the network cluster via the communication network; determine, based at least in part on the first operational status, that the first node is not fully operational; select at least a first countermeasure; and apply the at least first countermeasure to the first node.

Yet other embodiments provide non-transient computer readable media having stored therein instructions that when executed by a processing resource cause the processing resource to: receive a first operational status of a first node in a network cluster via a communication network; receive a second operational status of a second node in the network cluster via the communication network; determine, based at least in part on the first operational status, that the first node is not fully operational; select at least a first countermeasure; and apply the at least first countermeasure to the first node.

Turning to FIG. 1A, network architecture 100 is shown in accordance with some embodiments that includes a multi-node network cluster 118 capable incident detection and recovery overseen by an arbitration and countermeasures system 194. As shown, network architecture 100 includes a network 120 communicably coupling a user device 122 with network cluster 118 and a network 130 communicably coupling a user device 132 and arbitration and countermeasures system 194 to network cluster 118. Network cluster 118 includes a node 104a and a node 104b that are communicably coupled via a network 102. Nodes 104 may be any processor based device known in the art that is capable of transferring network traffic.

Network 102, network 120, and network 130 may be any type of networks or combination of networks. For example, any or all of networks 102, 120, 130 may include a combination of a home network accessed by a user device; a corporate network that connects nodes 104; and/or the Internet connecting the home network to the corporate network. As another example, any or all of networks 102, 120, 130 may be a single corporate network. Further, those skilled in the art will appreciate that any or all of networks 102, 120, 130 can be: a wireless network, a wired network or a combination thereof that can be implemented as one of the various types of networks, such as an Intranet, a Local Area Network (LAN), a Wide Area Network (WAN), an Internet, and/or the like. Further, any or all of networks 102, 120, 130 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like. Based upon the disclosure provided herein, one of ordinary skill in the art will recognize a variety of network types, network combinations, and/or connections that may be included as part of any or all of networks 102, 120, 130.

User device 122 and user device 132 may be any device known in the art that is capable of communicably coupling to one or more of networks 120, 130 and sending and receiving data via the network. Such user devices may include, but are not limited to, desktop computers; mobile phones, laptop computers, or tablet computers. Based upon the disclosure provided herein, one of ordinary skill in the art will recognize a variety of endpoint devices that may be used in relation to different embodiments.

Node 104a includes a sync interface 115 that is coupled to network 102 via a sync path 146, and node 104b includes a sync interface 110 is coupled to network 102 via a sync path 145. Nodes 104a, 104b communicate synchronizing information and commands via sync path 145, sync path 146, and network 102. Any subset of sync interface 115, sync path 146, network 102, sync path 145, and sync interface 110 may be referred to herein as the sync path. In addition, sync interface 115 provides operational status information via an external operational status link 191 where the operation status includes the operational status of node 104a as perceived by node 104a and the operational status of node 104b as that is perceived by node 104a. Similarly, sync interface 110 provides operational status information via an external operational status link 192 where the operation status includes the operational status of node 104b as perceived by node 104b and the operational status of node 104a as that is perceived by node 104b.

Node 104a includes a data transfer interface 117a and a data transfer interface 117b through which user traffic is processed. Similarly, node 104b includes a data transfer interface 112a and a data transfer interface 112b through which user traffic is processed. Thus, when node 104a is acting as a master, user traffic between user device 122 and user device 132 transfers via network 120, data path 141, data transfer interface 117b, data transfer interface 117a, data path 142, and network 130. Any subset of data transfer interface 117a and data transfer interface 117a is referred to herein as a node 104a user traffic path. Similarly, when node 104b is acting as a master, user traffic between user device 122 and user device 132 transfers via network 120, data path 144, data transfer interface 112a, data transfer interface 112b, data path 143, and network 130. Any subset of data transfer interface 112a and data transfer interface 112b is referred to herein as a node 104b user traffic path.

In operation, one of node 104a or node 104b operates as the master node handling user traffic for network cluster 118. The other node operates as a slave mode. When the master node fails, the other node is switched to be the master node and takes over processing the user traffic. This transition from slave node to master node has previously occurred whenever the sync path failed to operate properly. Such an approach has, in some cases, been found to result in split-brain scenarios where more than one node on network cluster 118 concurrently advertise itself as a master. There is a possibility that such a situation creates a broken network cluster on which user traffic exiting one node 104 could return via another node 104 without the session synchronization information passing over the sync path being present. Without the presence of such synchronization information, the user traffic will be rejected by the other node 104. Such a split-brain situation potentially renders network cluster 118 useless in the event more than one of nodes 104 advertises itself as the master to the same network layer addresses of the network. The risk exposure is greater where the network cluster 118 is a two-node network cluster (as shown in this embodiment). In such a situation, all nodes 104 of the network cluster 118 are advertising itself as the master and there are no other nodes that could be used in a quorum process to decide which node should assume the master role. Such a quorum process is only possible for a network node that has three or more nodes which is costly and in some cases impractical.

As one particular scenario using a two-node network cluster as an example, node 104a is operating as the master carrying user traffic over the node 104a user traffic path and node 104b is operating as the slave. Again, when user traffic is being processed properly, and the master node (in this case node 104a) and slave node (in this case node 104b) are engaged in synchronizing communications over the synchronization path. In such a scenario the sync path may fail (e.g., one or more of sync interface 110, sync interface 115, and/or network 102 may fail) while the node 104a user traffic path remains functional. Such a failure of the sync path causes the slave node (in this case node 104b) to assume that the master node (in this case node 104a) has failed, and to remedy this situation, the slave node begins to operate as a master node and thereby seamlessly take on the user traffic previously being directed to the other node. However, while the sync path has failed, the node 104a user traffic path is still operational and continuing to handle user traffic. This results in a split-brain scenario where both node 104a and node 104b simultaneously think the other node has become unavailable and therefore each must carry on or take over the master role. This could potentially create a bigger problem with both nodes forwarding user traffic at the same time and thereby breaking session statefulness. It could also bring network cluster 118 down in its entirety.

Another scenario that a split-brain scenario can introduce is where one or both of nodes 104a, 104b are still accepting ingress user traffic without a way to send egress traffic out (i.e., one of data transfer interfaces 117 is operational, but the other has failed). Such a scenario creates what is referred to herein as traffic black holing where one of nodes 104 accepts ingress user traffic, but cannot transfer the user traffic out leaving the user traffic trapped and preventing a proper failover to the other node 104 remote node.

Yet another scenario is referred to herein as a fail back scenario. A fail back scenario occurs when the user traffic path and the synchronization path for one of nodes 104a, 104b becomes available again after the onset of a split-brain scenario. In such a scenario, user traffic is redirected back to the node that recently became newly available. However, the newly available node will fail to seamlessly carry over user traffic that it starts to take back from the other node 104 that had stepped in to behave as the master because of a failure to properly synchronize the transfer using the synchronization path. Using an example where node 104a failed and node 104b began to operate as a master in place of node 104a. The user traffic is transferred to node 104b as would be expected for network cluster 118. Then node 104a becomes available again and before synchronization is possible with node 104b, starts operating as the master and taking the user traffic.

A cluster session synchronization conflict may occur because node 104a has stale user session information from its previous state before experiencing the split-brain situation. Node 104a might also reject the cluster session synchronization from node 104b because node 104a still considers itself to be the master. This occurs where the master node only happens in the direction from the master to the slave.

Another problem that arises is a scenario whereby a proper transfer from a master node to a slave node is completed, but that such a transfer was prematurely triggered. As it is a costly process to perform a failover, an avoidable failover results in considerable waste of resources. An example of premature triggering is where the master node is experiencing issues that suggest a need to transfer control to the slave node, but that such issues may be resolved within the master node, and thereby not require failover processing.

Some embodiments discussed herein provide for pre-failover arbitration and automated countermeasures applied by arbitration and countermeasures system 194. More specifically, arbitration and countermeasures system 194 receives operational information from sync interface 115 of node 104a and sync interface 110 of node 104b via network 130. Based upon this information, arbitration and countermeasures system 194 performs an arbitration to determine which, if either, of nodes 104a, 104b is not operating properly. Where one of nodes 104a, 104b is not operating properly, one or more automated countermeasures may be applied in an attempt to return the failing node to improved operational status. Where improved operational status is not achieved using the countermeasures, a failover countermeasure is applied. In some embodiments, such a failover countermeasure includes an automated process of requesting input from a human administrator 196, and awaiting an acceptance response from human operator 196 before proceeding with the failover countermeasure. In turn, the failover countermeasure performs the various processes that are required to facility transition from a master node (one of nodes 104) to a slave node (the other of nodes 104), and resetting of the failed node. Monitoring and application of countermeasures and failover control may be done similar to that discussed in one or more of FIGS. 2-5 below.

Figure 1B:
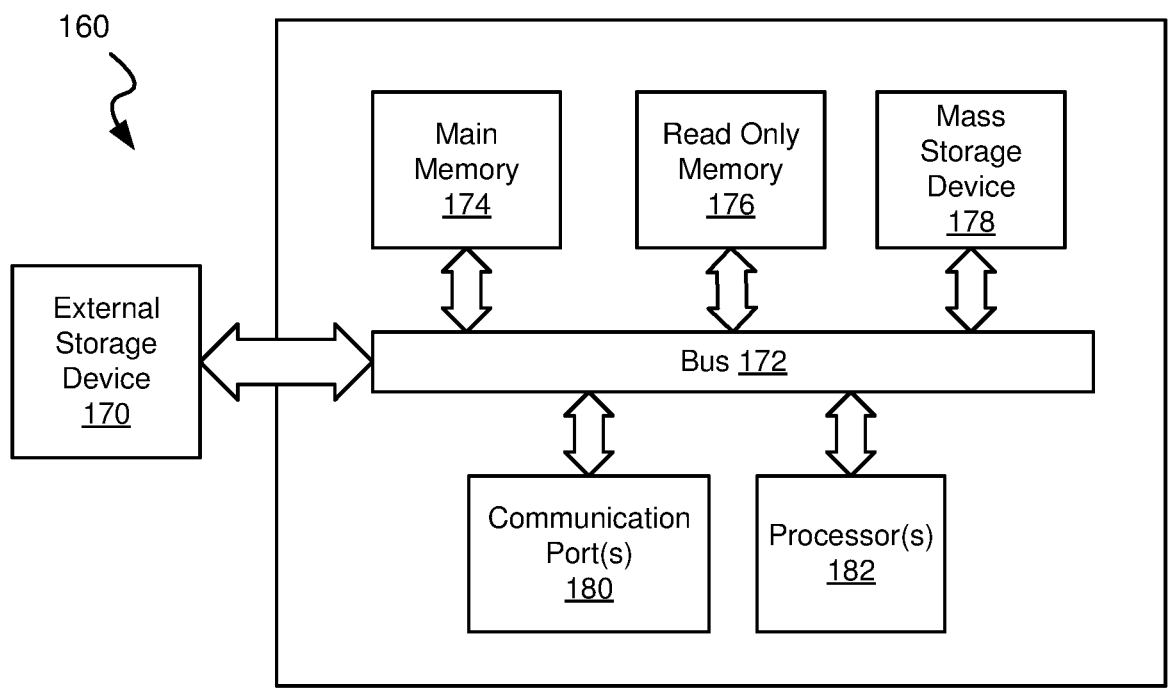

Turning to FIG. 1B, an example computer system 160 in which or with which embodiments of the present invention may be utilized is shown. In some case, one or more of node 104a or node 104b may be implemented to include the features of example computer system 160. As shown in FIG. 1B, computer system 160 includes an external storage device 170, a bus 172, a main memory 174, a read-only memory 176, a mass storage device 178, a communication port 180, and one or more processors 182.

Those skilled in the art will appreciate that computer system 160 may include more than one processor 182 and communication ports 180. Examples of processor 1820 include, but are not limited to, an Intel® Itanium® or Itanium 2 processor(s), or AMD® Opteron® or Athlon MP® processor(s), Motorola® lines of processors, Forti-SOC™ system on chip processors or other future processors. Processor 182 may include various modules associated with embodiments of the present invention.

Communication port 180 can be any of an RS-232 port for use with a modem-based dialup connection, a 10/100 Ethernet port, a Gigabit or 10 Gigabit port using copper or fiber, a serial port, a parallel port, or other existing or future ports. Communication port 180 may be chosen depending on a network, such as a Local Area Network (LAN), Wide Area Network (WAN), or any network to which the computer system connects.

Memory 174 can be Random Access Memory (RAM), or any other dynamic storage device commonly known in the art. Read-Only Memory 176 can be any static storage device(s) e.g., but not limited to, a Programmable Read-Only Memory (PROM) chips for storing static information e.g. start-up or BIOS instructions for processor 182.

Mass storage 178 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 172 communicatively couples processor(s) 182 with the other memory, storage, and communication blocks. Bus 172 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 182 to a software system.

Optionally, operator and administrative interfaces, e.g. a display, keyboard, and a cursor control device, may also be coupled to bus 172 to support direct operator interaction with the computer system. Other operator and administrative interfaces can be provided through network connections connected through communication port 180. An external storage device 170 can be any kind of external hard-drives, floppy drives, IOMEGA® Zip Drives, Compact Disc-Read-Only Memory (CD-ROM), Compact Disc-Re-Writable (CD-RW), Digital Video Disk-Read Only Memory (DVD-ROM). The components described above are meant only to exemplify various possibilities. In no way should the aforementioned example computer system limit the scope of the present disclosure.

Figure 2:
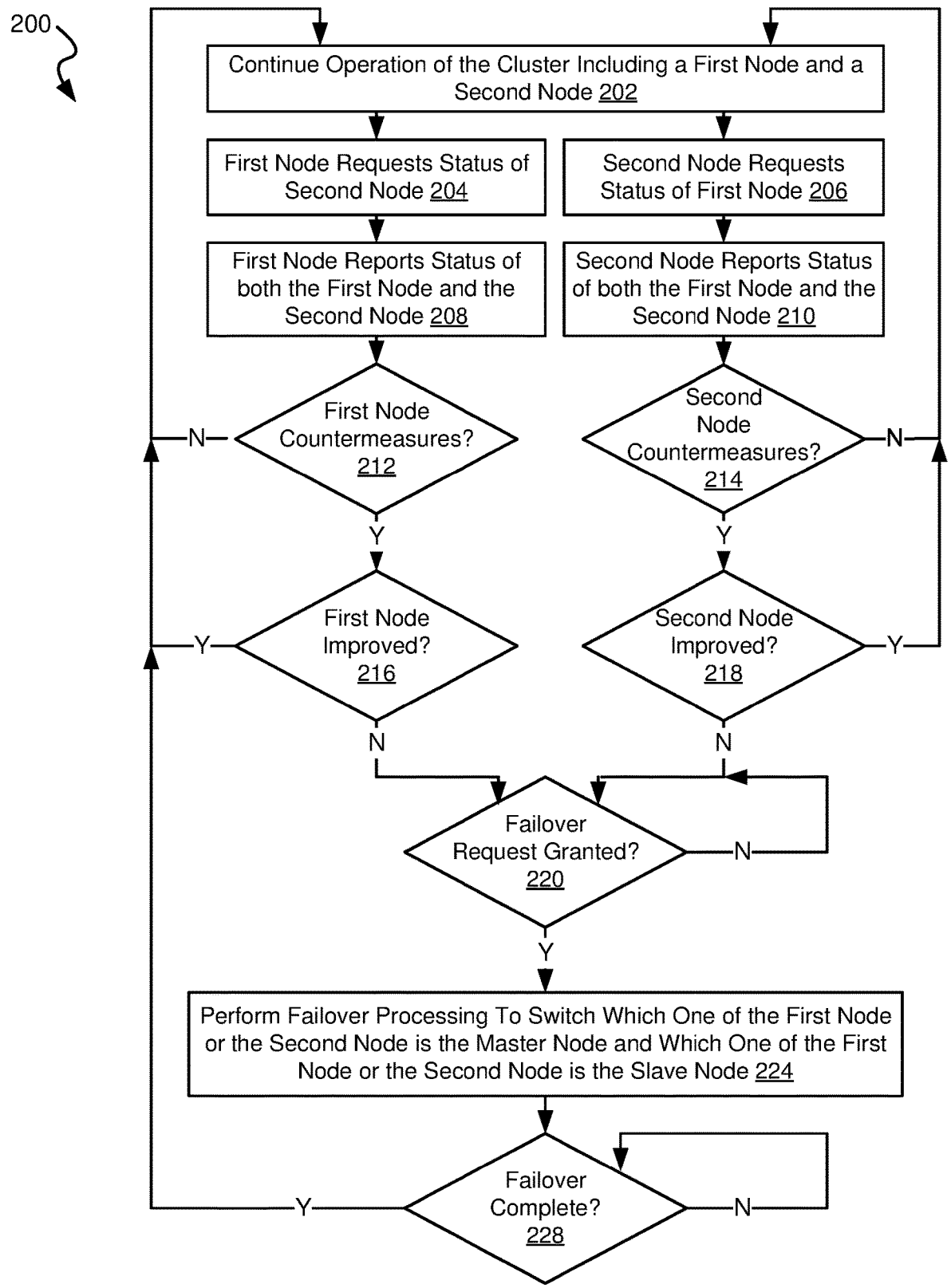
FIG. 2 is a flow diagram showing a method in accordance with some embodiments for resolving incidents in a multi-node network cluster using input from a an arbitration and countermeasures system.

Turning to FIG. 2, a flow diagram 200 shows a method in accordance with some embodiments for resolving incidents in a multi-node network cluster using input from an arbitration and countermeasures system. Flow diagram 200 shows the process from the perspective of a multi-node network cluster that includes a first node and a second node, with one of the first node or the second node operating as the master node, and the other of the first node or the second node operating as the slave node. Following flow diagram 200, operation of the cluster continues with one of the first node or the second node operating as the master node, and the other of the first node or the second node operating as the slave node (block 202). This continues until it is established that the master node has failed to the point that the slave node needs to take over as the master node allowing the former master node to be restarted as the slave node (i.e., until a failover is performed).

During operation, the first node requests status information from the second node (block 204). This status may be requested via a communication network that communicably couples the first node to the second node. The requested status may include a number of operational characteristics including, but not limited to, memory storage. Based upon the disclosure provided herein, one of ordinary skill in the art will recognize a variety of operational characteristics that represent the operation status of the second node and that may be requested by the first node. Similarly, the second node requests status information from the first node (block 206). This status may be requested via a communication network that communicably couples the first node to the second node. The requested status may include a number of operational characteristics including, but not limited to, memory storage. Based upon the disclosure provided herein, one of ordinary skill in the art will recognize a variety of operational characteristics that represent the operation status of the first node and that may be requested by the second node.

The first node reports both its own operational status and the operational status received from the second node to an arbitration and countermeasures system via a communication network (block 208). Similarly, the second node reports both its own operational status and the operational status received from the first node to an arbitration and countermeasures system via the communication network (block 210). When the multi-node network cluster is operating properly, the operational status received by the first node from the second node should be similar to that reported directly by the second node to the arbitration and countermeasures system, and should indicate that the second node is operating within expected parameters; and the operational status received by the second node from the first node should be similar to that reported directly by the first node to the arbitration and countermeasures system, and should indicate that the first node is operating within expected parameters.

Alternatively, where the operational status of the second node as reported directly by the second node is different from that reported by the first node, it indicates that either the communications between the first node and the second node have become inoperable, or that one of the first node or the second node is not operating properly. Either way, it indicates a potential failure of the multi-node network cluster. Similarly, where the operational status of the first node as reported directly by the first node is different from that reported by the second node, it indicates that either the communications between the first node and the second node have become inoperable, or that one of the first node or the second node is not operating properly. Either way, it indicates a potential failure of the multi-node network cluster. This information is used by the arbitration and countermeasures system to determine whether countermeasures are to be applied to one or both of the first node and/or the second node in an effort to correct any ongoing issue.

To this end, it is determined whether the arbitration and countermeasures system has responded with one or more countermeasures that are to be applied to the first node (block 212). Where no countermeasures are to be applied (block 212), it is an indication that arbitration and countermeasures system considers the first node to be operating within an expected range and in such a situation nothing remains to be done in the first node at this juncture.

Similarly, it is determined whether the arbitration and countermeasures system has responded with one or more countermeasures that are to be applied to the second node (block 214). Where no countermeasures are to be applied (block 214), it is an indication that arbitration and countermeasures system considers the second node to be operating within an expected range and in such a situation nothing remains to be done in the second node at this juncture.

Alternatively, where countermeasures are applied to the first node, it is determined whether the operational status of the first node has been improved sufficiently to bring it within its expected range (block 216). Where application of the countermeasures has yielded such an improvement (block 216), there is nothing that remains to be done in the first node at this juncture. Similarly, where countermeasures are applied to the second node, it is determined whether the operational status of the second node has been improved sufficiently to bring it within its expected range (block 218). Where application of the countermeasures has yielded such an improvement (block 218), there is nothing that remains to be done in the second node at this juncture.

On the other hand, where any countermeasures applied to either the first node or the second node fail to improve the operational status of the respective node (block 216 and block 218), it is time to perform a failover where the node currently operating as the slave node is transitioned to operate as the master node, and the node currently operating as the master node is reset and brought back online as the slave node. The final decision on performing the failover is made by arbitration and countermeasures system, and to this end it is determined whether a request for a failover has been received from arbitration and countermeasures system (block 220). Once the request is received (block 220), failover processing is performed to switch the node currently operating as the slave node to the master node, and the node currently operating as the master node is reset and brought back online as the slave node (block 224). This may be done using any failover processes known in the art. Once the failover processing is complete (block 228), standard operation is renewed with the new assignments of master node and slave node.

Figure 3:
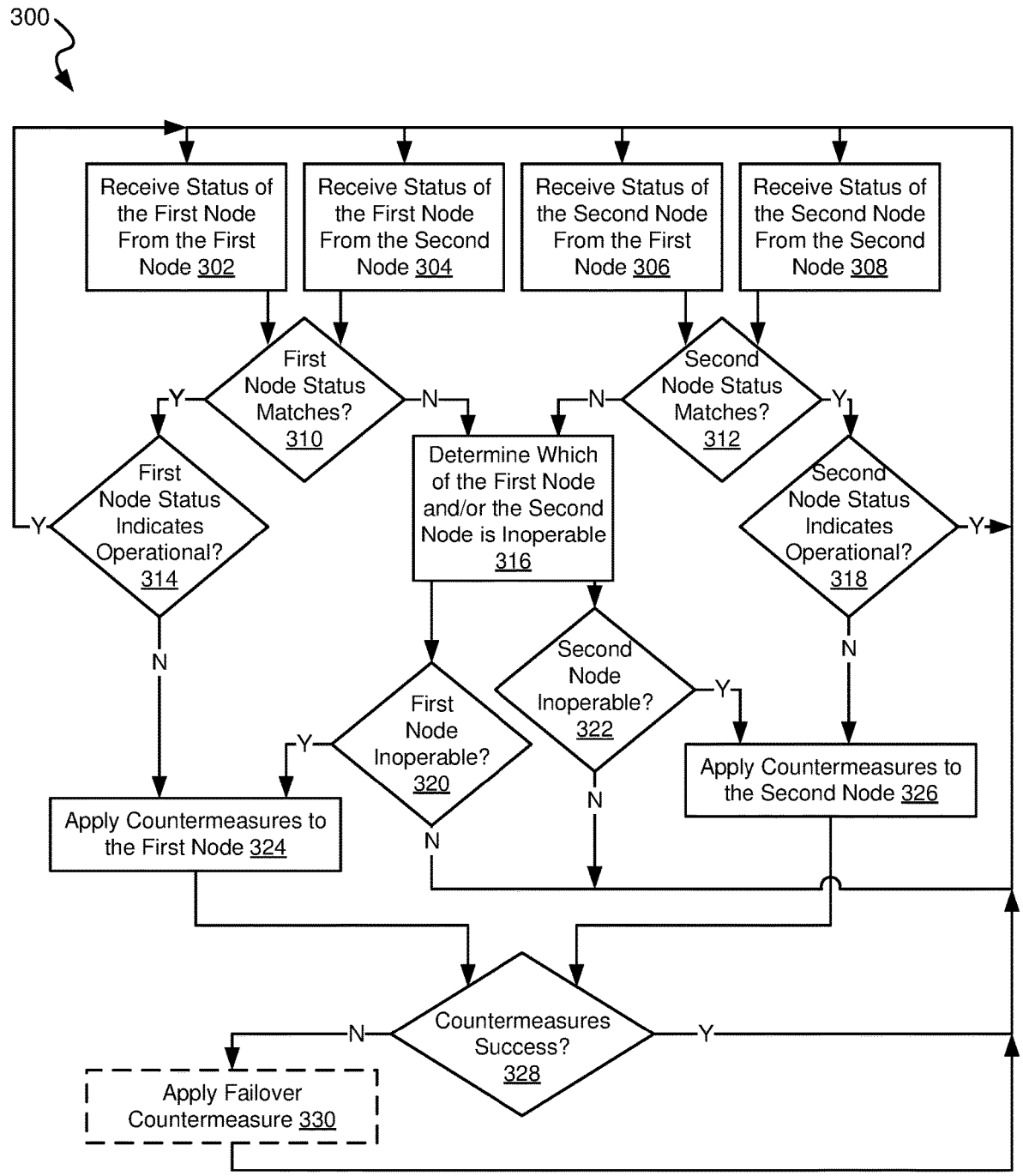
FIG. 3 is a flow diagram showing a method in accordance with some embodiments for addressing information received from a multi-node network cluster.

Turning to FIG. 3, a flow diagram 300 shows a method in accordance with some embodiments for addressing information received from a multi-node network cluster. Flow diagram 300 shows the process from the perspective of an arbitration and countermeasures system. Following flow diagram 300, operational status of a first node of the multi-node network cluster is received from the first node (block 302); operational status of the first node is received from a second node of the multi-node network cluster (block 304); operational status of the second node is received from a first node (block 306); and operational status of the second node is received from a second node (block 308). As discussed above in relation to FIG. 2, the first node requests operational status information from the second node via a communication network, and the second node requests operational status information from the first node via the communication network. Each node reports the operational status received from the other node and its own operational status. The operation status may include a number of operational characteristics including, but not limited to, memory storage. Based upon the disclosure provided herein, one of ordinary skill in the art will recognize a variety of operational characteristics that represent the operation status of a node in the multi-node cluster.

It is determined whether the first node's operational status reported by the first node matches that reported by the second node (block 310); and whether the second node's operational status reported by the second node matches that reported by the first node (block 312). When the multi-node network cluster is operating properly, the operational status received by the first node from the second node should be similar to that reported directly by the second node to the arbitration and countermeasures system. Where the first node's operational status matches for that reported by both the first node and the second node (block 310), it is determined whether the first node's operational status is within an expected range (block 314). Where it is within an expected range (block 314), there is nothing more to do with the first node at this juncture. Similarly, where the second node's operational status matches for that reported by both the first node and the second node (block 312), it is determined whether the second node's operational status is within an expected range (block 318). Where it is within an expected range (block 318), there is nothing more to do with the second node at this juncture.

Alternatively, it is determined which of the first node or the second node is not operating properly when either: the first node's operational status reported by the first node does not match that reported by the second node (block 310), or the second node's operational status reported by the first node does not match that reported by the second node (block 312)(block 316). Where such a mismatch occurs, something is not operating properly within the multi-node network cluster.

Where it is either determined that the first node is not operating properly as part of analyzing a mismatch in reported operational status (block 320), or it is determined that the reported operational status of the first node matches but is not within an expected range (block 314), countermeasures are selected and applied to the first node (block 324). This may be done by generating a network incident internal to the arbitration and countermeasures system which triggers application of countermeasures as more fully discussed below in relation to FIGS. 5-11. After applying the countermeasures, it is determined whether the operational status of the first node has been brought within an expected range (block 328). Where they have been brought within an expected range (block 328), there is nothing that remains to be done with the first node at this juncture.

Similarly, where it is either determined that the second node is not operating properly as part of analyzing a mismatch in reported operational status (block 322), or it is determined that the reported operational status of the second node matches but is not within an expected range (block 318), countermeasures are selected and applied to the first node (block 326). Again, this may be done by generating a network incident internal to the arbitration and countermeasures system which triggers application of countermeasures as more fully discussed below in relation to FIGS. 5-11. After applying the countermeasures, it is determined whether the operational status of the second node has been brought within an expected range (block 328). Where they have been brought within an expected range (block 328), there is nothing that remains to be done with the second node at this juncture.

Alternatively, where either countermeasures applied to the first node or countermeasures applied to the second node failed to bring the respective node within an expected operational range (block 328), a failover is requested (block 330). Block 330 is shown in dashed lines as an embodiment of this process is shown in more detail in FIG. 4 below. As discussed below in relation to FIG. 4, a failover may be delayed until it is approved by a human administrator. Ultimately, the failover request is provided from the arbitration and countermeasures system to the multi-node network cluster which implements the failover.

Figure 4:
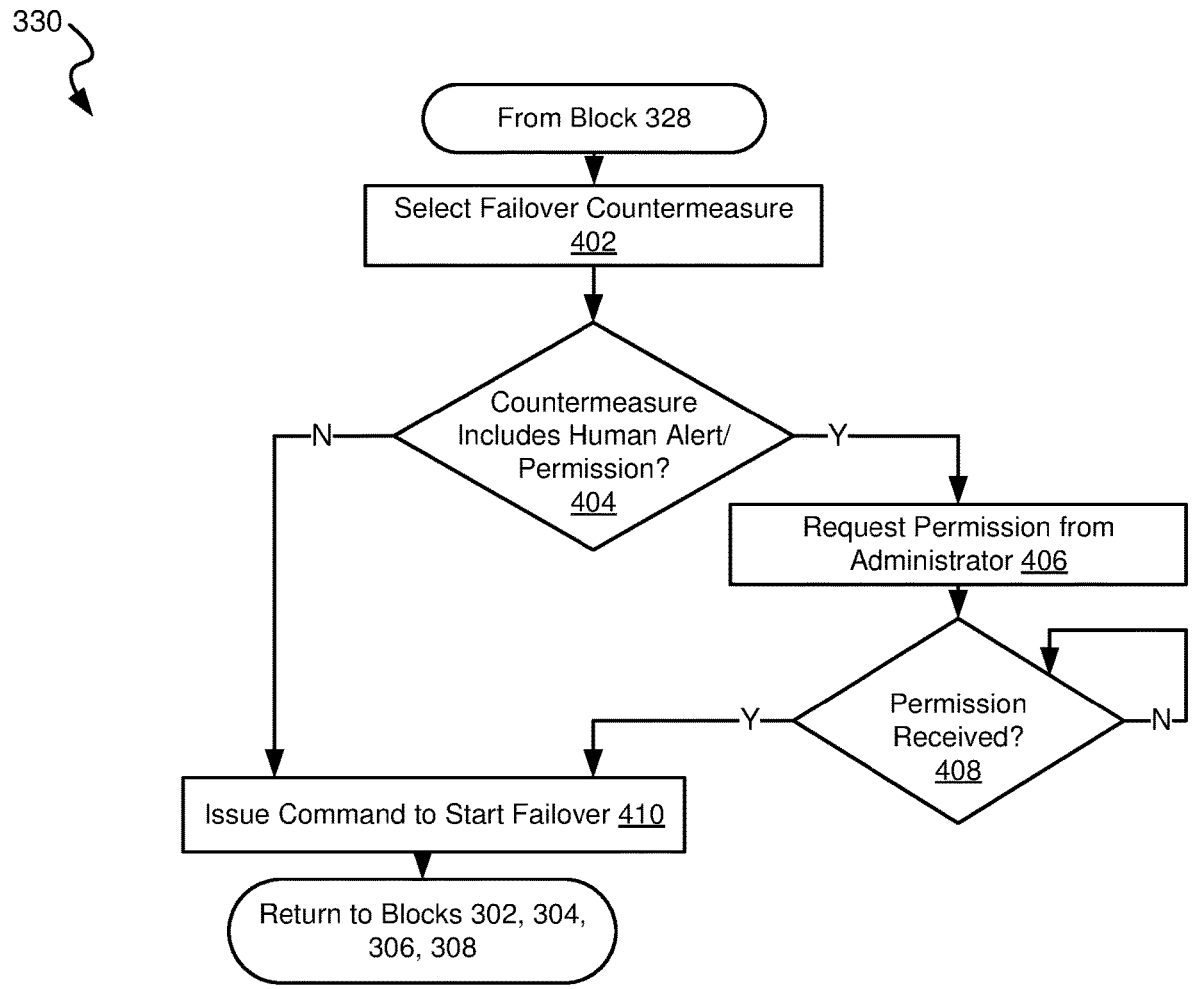
FIG. 4 is a flow diagram showing a method in accordance with some embodiments for applying a failover countermeasure to a multi-node network cluster.

Turning to FIG. 4, a flow diagram 400 shows a method in accordance with some embodiments for applying a failover countermeasure to a multi-node network cluster. Following flow diagram 400, a failover countermeasure is selected (block 402). It is determined whether the selected failover countermeasure includes alerting a human operator and asking permission before executing a failover (block 404). Where permission is required (block 404), permission is requested from the human administrator (block 408). Where either permission is not required (block 404) or permission has been received (block 408), a command to execute a failover is issued (block 410).

Figure 5:
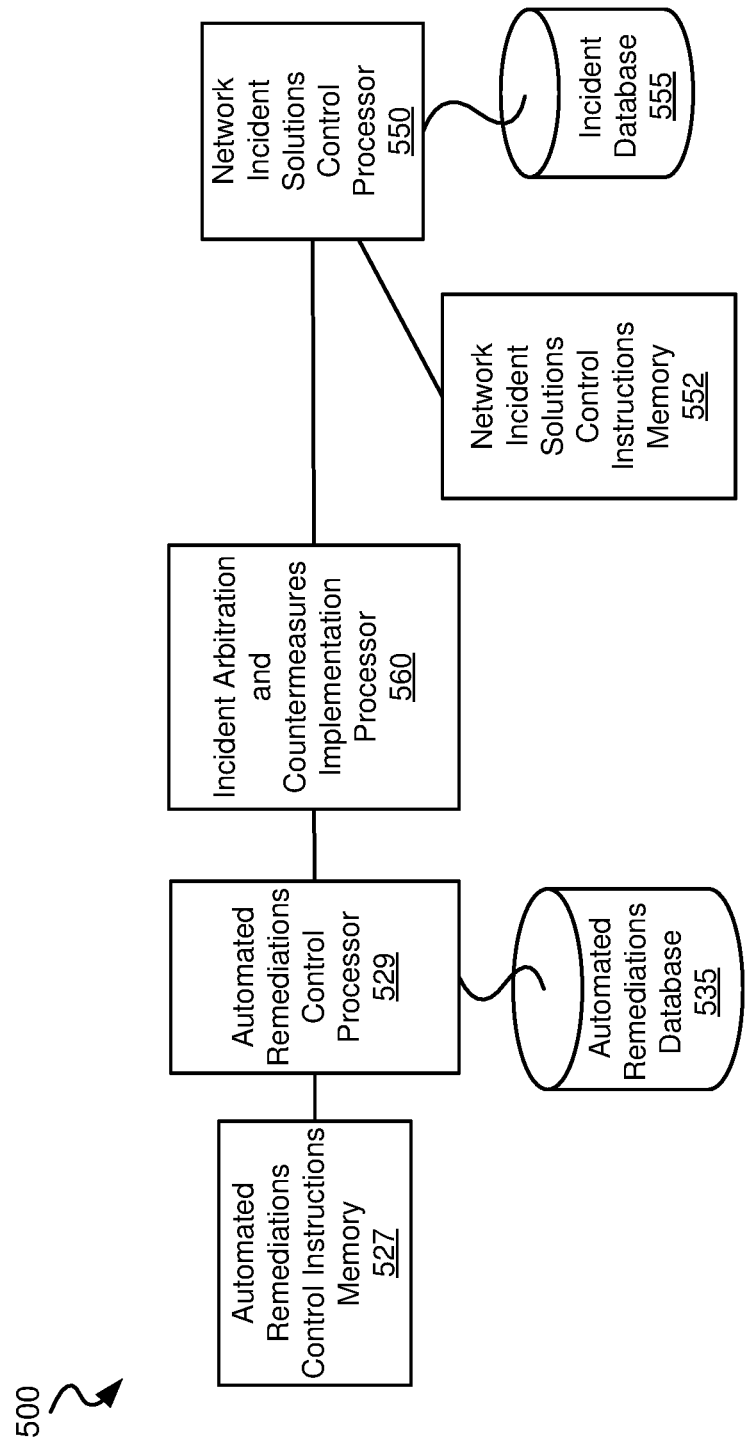
FIG. 5 depicts an implementation of an arbitration and countermeasures system in accordance with some embodiments.

Turning to FIG. 5, an arbitration and countermeasures system 500 is shown in accordance with some embodiments. As shown, arbitration and countermeasures system 500 includes an incident arbitration and countermeasures implementation processor 560, an automated remediations control processor 529, and a network incident solutions control processor 550. Incident arbitration and countermeasures implementation processor 560 is configured to: receive status from a first node that includes the status of the first node and the status of a second node from the perspective of the first node; and receive status from the second node that includes the status of the second node and the status of a first node from the perspective of the second node.

Incident arbitration and countermeasures implementation processor 560 determines whether the first node's operational status reported by the first node matches that reported by the second node; and whether the second node's operational status reported by the second node matches that reported by the first node. When the multi-node network cluster is operating properly, the operational status received by the first node from the second node should be similar to that reported directly by the second node to the arbitration and countermeasures system. Where the first node's operational status matches for that reported by both the first node and the second node, incident arbitration and countermeasures implementation processor 560 determines whether the first node's operational status is within an expected range. Where it is within an expected range, there is nothing more to do with the first node at this juncture. Similarly, where the second node's operational status matches for that reported by both the first node and the second node, incident arbitration and countermeasures implementation processor 560 determines whether the second node's operational status is within an expected range. Where it is within an expected range, there is nothing more to do with the second node at this juncture.

Alternatively, incident arbitration and countermeasures implementation processor 560 determines which of the first node or the second node is not operating properly when either: the first node's operational status reported by the first node does not match that reported by the second node, or the second node's operational status reported by the first node does not match that reported by the second node. Where such a mismatch occurs, something is not operating properly within the multi-node network cluster.

Where it is either determined that the first node is not operating properly as part of analyzing a mismatch in reported operational status, or it is determined that the reported operational status of the first node matches but is not within an expected range, incident arbitration and countermeasures implementation processor 560 triggers a network incident to automated remediations control processor 529, and network incident solutions control processor 550 that causes them to implement one or more countermeasures in relation to either or both of the first node and/or the second node based upon which node(s) appears to be operating outside of its expected range. Generation of such a network incident triggers application of countermeasures as more fully discussed below in relation to FIGS. 5-11.

In this embodiment, network incident solutions control processor 550 is communicably coupled to endpoint devices 506-1, 506-2, . . . , 506-N via a network 502. Further, an automated remediations control processor 529 is communicably coupled to incident solutions control processor 550 and to endpoint devices 506-1, 506-2, . . . , 506-N via network 502. Network incident solutions control processor 550 may provide a cloud-based service sourcing a variety of services via network 502. Similarly, automated remediations control processor 529 may provide a cloud-based service sourcing a variety of services via network 502. In some cases, such cloud-based services may be implemented within a public cloud, a private cloud, or a hybrid cloud. Based upon the disclosure provided herein, one of ordinary skill in the art will recognize a variety of network architectures in which network incident solutions control processor 550 and/or automated remediations control processor 529 may be deployed.

Network incident solutions control processor 550 may include one or more processors and/or circuitry implementing processing functions provided by network incident solutions control processor 550. Network incident solutions control processor 550 is coupled to a memory 552 that includes instructions executable by network incident solutions control processor 550 to perform one or more of the processing functions provided by network incident solutions control processor 550. In addition, network incident solutions control processor 550 is coupled to an incident database 555 that includes incident data. The incident data is a catalog of information about network element malfunctions including solutions for the cataloged network element malfunctions.

Automated remediations control processor 529 may include one or more processors and/or circuitry implementing processing functions provided by automated remediations control processor 529. Automated remediations control processor 529 is coupled to a memory 527 that includes instructions executable by network incident solutions control processor 550 to perform one or more of the processing functions provided by automated remediations control processor 529. In addition, automated remediations control processor 529 is coupled to an automated remediations database 535 that includes pre-programmed automated remediations.

Endpoint devices 506-1, 506-2 . . . 506-N (which may be collectively referred to as endpoint devices 506, and may be individually referred to as endpoint device 506 herein) associated with network 502 may include, but are not limited to, personal computers, smart devices, web-enabled devices, hand-held devices, laptops, mobile devices, and the like. In some embodiments, network incident solutions control processor 550 may interact with users 504-1, 504-2 . . . 504-N (which may be collectively referred to as users 504, and may be individually referred to as a user 504 herein) through network 502 via their respective endpoint devices 506, for example, when interacting to mitigate a network element malfunction, a user 504 may be asked a variety of questions about the time and circumstance of the malfunction which user 504 enters via their respective endpoint device.

An automated incident monitor 522 (e.g., automated incident monitor 522-1, automated incident monitor 522-2, and automated incident monitor 522-N) is associated with respective ones of endpoint devices 506. In some cases, automated incident monitor 522 is an application operating on a respective endpoint device 506 or on an device forming part of network 502 such as, for example, a server, firewall, or cloud service machine. Automated incident monitor 522 is configured to detect malfunctions with the device on which it is executing, applications executing on the device on which it is executing, and/or with other devices and/or services included in or supported as part of network 502 and with which automated incident monitor 522 has vision. One or more automated incident monitors 522 (e.g., automated incident monitor 522-N+1) may be executed by respective network devices and or cloud services included and/or supported as part of network 502. Such automated incident monitors 522 are configured to detect malfunctions with the device on which it is executing, applications executing on the device on which it is executing, and/or with other devices and/or services included in or supported as part of network 502 and with which automated incident monitor 522 has vision. Based upon the disclosure provided herein, one of ordinary skill in the art will recognize a variety of implementations of automated incident monitor 522 that may be used in relation to different embodiments. In operation, when automated incident monitor 522 detects a network element malfunction, it generates an incident alert that is sent to network incident solutions control processor 550.

Those skilled in the art will appreciate that, network 502 can be a wireless network, a wired network or a combination thereof that can be implemented as one of the various types of networks, such as an Intranet, a Local Area Network (LAN), a Wide Area Network (WAN), an Internet, and the like. Further, network 502 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

After applying the countermeasures, incident arbitration and countermeasures implementation processor 560 determines whether the operational status of both the first node and the second node are within an expected range. Where they are both within the expected range, no failover is required. Alternatively, where either is not within its expected operational range, a failover countermeasure is accessed. Such a failover counter measure results in issuing a failover command to the multi-node network cluster. In some cases, this command is delayed until permission from a human administrator is sought and received. The failover countermeasure may operate similar to that discussed above in relation to FIG. 4.

In conclusion, the present invention provides for novel systems, devices, and methods. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for providing multi-node network cluster oversight, the method comprising:
    monitoring, by a processing resource of an arbitration system, a first node operating in a role of a master node of a network cluster and a second node operating in a role of a slave node of the network cluster, wherein the arbitration system is external to the network cluster;
    receiving, by the processing resource, a first set of operational status information including (i) a first operational status of the first node and (ii) a first operational status of the second node from the perspective of the first node, wherein the first set of operational status information is received directly from the first node via a communication network and wherein the first set of operational status information further includes a first set of one or more operational characteristics, relating to one or more of memory usage and storage usage, of one or both of the first node and the second node;
    receiving, by the processing resource, a second set of operational status information including (i) a second operational status of the first node and (ii) a second operational status of the second node from the perspective of the second node, wherein the second set of operational status information is received directly from the second node via the communication network and wherein the second set of operational status information further includes a second set of one or more operational characteristics, relating to one or more of memory usage and storage usage, of one or both of the first node and the second node;
    determining, by the processing resource, based at least in part on the first set of operational status information and the second set of operational status information that the first node is not fully operational;
    selecting, by the processing resource, at least a first countermeasure; and
    applying, by the processing resource, the at least first countermeasure to the first node.

2. The method of claim 1, wherein the first countermeasure is a failover countermeasure, and wherein the network cluster transitions the first node to operate in the role of the slave node and the second node to operate in the role of the master node upon application of the first countermeasure.

3. The method of claim 2, wherein application of the first countermeasure includes:
    requesting, by the processing resource, permission to perform a failover in the network cluster from an administrator; and
    commanding, by the processing resource upon receiving permission from the administrator, the network cluster to perform the failover.

4. The method of claim 1, wherein the first countermeasure is operable to improve the operational status of the first node, the method further comprising:
    determining, by the processing resource, that application of the first countermeasure in the first node failed to bring the first node to an expected operational standard; and
    applying, by the processing resource, a second countermeasure to the first node based at least in part on the failure of the first countermeasure.

5. The method of claim 4, wherein the second countermeasure is a failover countermeasure, and wherein the network cluster transitions the first node to operate in the role of the slave node and the second node to operate in the role of the master node upon application of the second countermeasure.

6. The method of claim 1, wherein there is a mismatch between the first set of operational status information reported by the first node and the second set of operational status information reported by the second node, and wherein determining that the first node is not fully operational is based at least in part on the mismatch.

7. The method of claim 1, wherein determining that the first node is not fully operational is based at least in part on the first set of operational status information reported by the first node and the second set of operational status information reported by the second node both indicating that the first node is operating below an expected standard.

8. A system for providing multi-node network cluster oversight, the system comprising:
    a processing resource;
    a non-transitory computer readable medium coupled to the processing resource and having stored therein instructions that when executed by the processing resource cause the processing resource to:
    monitor a first node operating in a role of a master node of a network cluster and a second node operating in a role of a slave node of the network cluster, wherein the system is external to the network cluster;
    receive a first set of operational status information including (i) a first operational status of the first node and (ii) a first operational status of the second node from the perspective of the first node, wherein the first set of operational status information is received directly from the first node via a communication network and wherein the first set of operational status information further includes a first set of one or more operational characteristics, relating to one or more of memory usage and storage usage, of one or both of the first node and the second node;
    receive a second set of operational status information including (i) a second operational status of the first node and (ii) a second operational status of the second node from the perspective of the second node, wherein the second set of operational status information is received directly from the second node via the communication network and wherein the second set of operational status information further includes a second set of one or more operational characteristics, relating to one or more of memory usage and storage usage, of one or both of the first node and the second node;

determine, based at least in part on the first set of operational status information and the second set of operational status information, that the first node is not fully operational;

select at least a first countermeasure; and apply the at least first countermeasure to the first node.

9. The system of claim 8, wherein the first countermeasure is a failover countermeasure, and wherein the network cluster transitions the first node to operate in the role of the slave node and the second node to operate in the role of the master node upon application of the first countermeasure.

10. The system of claim 9, wherein application of the first countermeasure includes:

requesting permission to perform a failover in the network cluster from an administrator;

upon receiving permission from the administrator, commanding the network cluster to perform the failover.

11. The system of claim 8, wherein the first countermeasure is operable to improve the operational status of the first node, wherein the non-transient computer readable medium further has stored therein instructions that when executed by the processing resource cause the processing resource to:

determine that application of the first countermeasure in the first node failed to bring the first node to an expected operational standard; and apply a second countermeasure to the first node based at least in part on the failure of the first countermeasure.

12. The system of claim 11, wherein the second countermeasure is a failover countermeasure, and wherein the network cluster transitions the first node to operate in the role of the slave node and the second node to operate in the role of the master node upon application of the second countermeasure.

13. The system of claim 8, wherein there is a mismatch between the first set of operational status information reported by the first node and the second set of operational status information reported by the second node, and wherein determining that the first node is not fully operational is based at least in part on the mismatch.

14. The system of claim 8, wherein determining that the first node is not fully operational is based at least in part on the first set of operational status information reported by the first node and the second set of operational status information reported by the second node both indicating that the first node is operating below an expected standard.

15. A non-transitory computer readable medium having stored therein instructions that when executed by a processing resource of an arbitration service external to a network cluster cause the processing resource to:

monitor a first node operating in a role of a master node of the network cluster and a second node operating in a role of a slave node of the network cluster, wherein the system is external to the network cluster;

receive a first set of operational status information including (i) a first operational status of a first node and (ii) a first operational status of the second node from the perspective of the first node, wherein the first set of operational status information is received directly from the first node via a communication network;

receive a second set of operational status information including (i) a second operational status of the first node and (ii) a second operational status of the second node from the perspective of the second node, wherein the second set of operational status information is received directly from the second node via the communication network;

determine, based at least in part on the first set of operational status information and the second set of operational status information, that the first node is not fully operational;

select at least a first countermeasure; and apply the at least first countermeasure to the first node.

16. The non-transitory computer readable medium of claim 15, wherein the first countermeasure is a failover countermeasure, and wherein the network cluster transitions the first node to operate in the role of the slave node and the second node to operate in the role of the master node upon application of the first countermeasure.

17. The non-transitory computer readable medium of claim 16, wherein application of the first countermeasure includes:

requesting permission to perform a failover in the network cluster from an administrator;

upon receiving permission from the administrator, commanding the network cluster to perform the failover.

18. The non-transitory computer readable medium of claim 17, wherein the first countermeasure is operable to improve the operational status of the first node, wherein the non-transient computer readable medium further has stored therein instructions that when executed by the processing resource cause the processing resource to:

determine that application of the first countermeasure in the first node failed to bring the first node to an expected operational standard; and apply a second countermeasure to the first node based at least in part on the failure of the first countermeasure.

* * * * *